United States Patent
Fatehi et al.

(10) Patent No.: US 6,535,313 B1
(45) Date of Patent: Mar. 18, 2003

(54) DYNAMICALLY ASSIGNABLE OPTICAL SIGNAL ACCESS CONTROL APPARATUS

(75) Inventors: Mohammad Taghi Fatehi, Middletown Township, Monmouth County, NJ (US); Kazem Anaraky Sohraby, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/173,793

(22) Filed: Oct. 16, 1998

(51) Int. Cl.[7] .......................... H04J 14/00; H04J 14/02; H04J 14/08
(52) U.S. Cl. ...................... 359/139; 359/124; 359/127; 359/128; 359/117
(58) Field of Search ................................ 359/117, 139, 359/123, 124, 128; 370/230, 412, 413, 428, 429

(56) References Cited

U.S. PATENT DOCUMENTS

| | | | | |
|---|---|---|---|---|
| 5,475,679 A | * | 12/1995 | Munter | 370/58.2 |
| 5,784,372 A | * | 7/1998 | Faulds | 370/398 |
| 5,901,139 A | * | 5/1999 | Shinohara | 370/232 |
| 5,956,165 A | * | 9/1999 | Fee et al. | 359/118 |
| 6,069,892 A | * | 5/2000 | Tochio | 370/395 |
| 6,452,901 B1 | * | 9/2002 | Yang et al. | 370/231 |

* cited by examiner

*Primary Examiner*—Leslie Pascal
*Assistant Examiner*—M. R. Sedighian
(74) *Attorney, Agent, or Firm*—John A. Caccuro

(57) ABSTRACT

An optical signal access apparatus responds to variations in network traffic by dynamically assigning the number of wavelengths at originating and terminating optical signal access apparatus. A controller of an optical signal access apparatus monitors network traffic by checking the occupancy level (or other parameters) of data buffers and determines therefrom the number of optical signals that should be allocated to handle the network traffic from those buffers. When the optical signal access apparatus is part of a router it can be used to control traffic at the router as well as on the links between the routers of an optical network.

15 Claims, 9 Drawing Sheets

FIG. 10

| $y^1$ \ $y^2$ | $y^2 \leq Th_0$ | $x_0 < y^2 \leq Th_1$ | $x_1 < y^2 \leq Th_2$ | ... |
|---|---|---|---|---|
| $y^1 \leq Th_0$ | $A_0, B_0$ | $A_0, B_1$ | $A_0, B_2$ | ... |
| $Th_0 < y^1 \leq Th_1$ | $A_1, B_0$ | $A_1, B_1$ | $A_1, B_2$ | ... |
| $Th_1 < y^1 \leq Th_2$ | $A_2, B_0$ | $A_2, B_1$ | $A_2, B_2$ | ... |
| ... | ... | ... | ... | |

DYNAMICALLY ASSIGNABLE OPTICAL SIGNAL ACCESS CONTROL APPARATUS

TECHNICAL FIELD OF THE INVENTION

This invention relates to optical signal assignment in an optical wavelength division multiplexing (WDM) network and, more particularly, to an access control arrangement including a dynamically assignable optical signal modulator and demodulator apparatus for use in such a WDM network.

BACKGROUND OF THE INVENTION

In a communication network, optical links are used to interconnect switches, routers, and multiplexers. On each optical link, a number of wavelengths are supported using Wave Division Multiplexing (WDM). At different times it is necessary to increase and/or reduce the number of wavelengths needed to provide the desired communication services over the optical links. The need for changing the number of assigned wavelengths is due to variation in traffic demand on each link between two nodes, or among various origination/termination switches/routers. Furthermore, it is desirable to eliminate the need for packet buffers at routers in the network as much as possible in order to improve network performance.

In the above-described applications, what is needed is a method for adjusting the number of wavelengths based on traffic demand at originating/terminating routers as well as traffic demand on the links between the routers.

SUMMARY OF THE INVENTION

Our inventive method and apparatus solves the above needs by effectively responding to variations in network traffic by dynamically assigning the number of wavelengths at originating and terminating optical signal access apparatus. A controller of an optical signal access apparatus monitors network traffic by checking the occupancy level of a data buffer and determines therefrom the number of optical signals that should be allocated to handle the network traffic from that buffer. When the optical signal access apparatus is part of a router it can be used to control traffic at the router as well as on the links between the routers of an optical network.

More particularly, an optical signal access apparatus is disclosed comprising (1) a data buffer for storing received electrical data packets and for outputting electrical data packets; (2) a plurality of optical signal modulators, each for modulating a different optical signal using the outputted data packets from the buffer; (3) a switch, responsive to a control signal, for switchable connecting the outputted data packets to one or more of the plurality optical signal modulators; and (4) a controller for checking a data packet occupancy level of the buffer and, in response thereto, sending said control signal to the switch indicating a number of the plurality optical signal modulators to be assigned to receive the outputted data packets from the data buffer.

According to another aspect of the invention, the optical signal access apparatus may be part of an optical router including (1) an optical switch having a plurality of inputs for receiving modulated optical signals from the optical modulators and for switchable connecting them to a plurality of outputs; (2) a plurality of wavelength interchangers connected to the outputs of the optical switch, each wavelength interchanger for changing a received optical signal to a selected one of a group of wavelengths in response to a control signal from the controller; and (3) an optical multiplexer for multiplexing together the selected wavelengths outputted from the interchangers into a wavelength division multiplexed (WDM) optical signal.

According to another aspect of the invention, the optical modulators are wavelength selectable lasers having wavelengths that are selected in response to a control signal from the controller and the optical signal access apparatus is part of an optical router including an optical multiplexer for multiplexing together the selected wavelengths outputted from the wavelength selectable lasers into a wavelength division multiplexed (WDM) optical signal.

According to yet another aspect, the optical signal access apparatus also includes (1) a plurality of optical signal demodulators, each for demodulating a different received optical signal into electrical data packets; (2) a second switch, responsive to a second control signal, for switchable connecting electrical data packets outputted from one or more of the plurality optical signal modulators to a second data buffer; (3) the second data buffer used for storing received electrical data packets and for outputting electrical data packets; and (4) a second controller responsive to a received third control signal for sending the second control signal to the second switch indicating the number of optical signal modulators to be connected to the second data buffer.

When the optical signal access apparatus is part of an optical network including a plurality of routers, the controller is responsive to communications with those routers for determining the number and wavelengths of optical signals assigned to the optical signal access apparatus.

BRIEF DESCRIPTION OF THE DRAWING

In the drawing,

FIG. 10 shows, for the case of multiple links in parallel at an optical access multiplexer, an illustrative table for mapping different buffer occupancy thresholds to the number of wavelengths assigned to that buffer.

DETAILED DESCRIPTION

Figure 1:
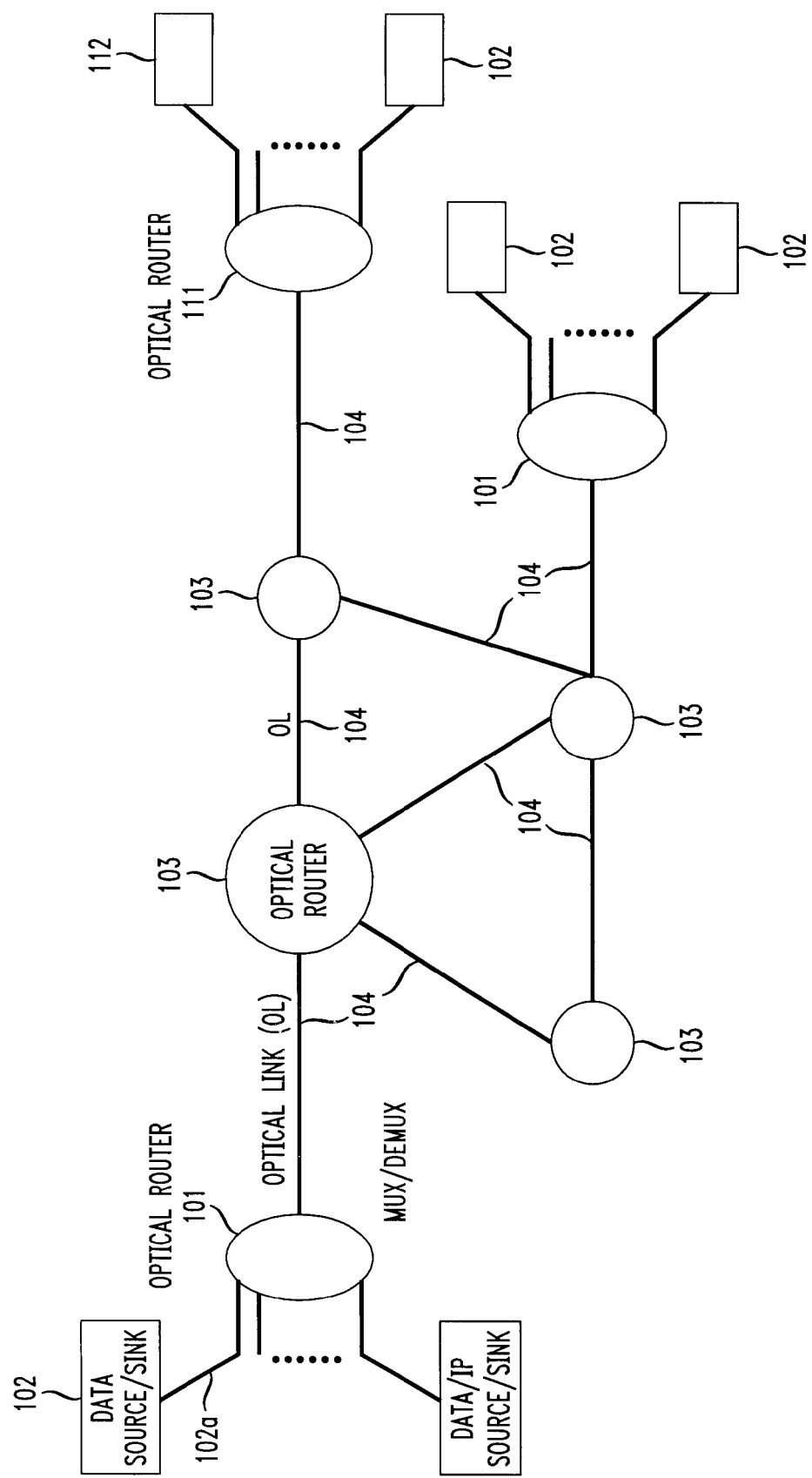
FIG. 1 shows an illustrative block diagram of an optical network in which the present invention may be utilized.

In the following description, each item or block of each figure has a reference designation associated therewith, the first number of which refers to the figure in which that item is first described (e.g., 101 is first described in FIG. 1).

In order to realize a future generation Internet, greater performance improvement in the form of end-user delay, and improved access speed to various servers should be achieved. An Optical Network (ON), shown in FIG. 1, is one such step toward an improvement and creation of the next generation internet, an optical internet (OI). With reference to FIG. 1, the ON includes multiplexers/demultiplexers 101 to concentrate/distribute traffic, received over facilities 102a, from various end user data source/sink 102. Illustratively, the user data source/sink can be implemented as a server with an optical network interface. Using an optical link (OL) transport, traffic is carried from the server 102 through the originating router 101 through switches/routers 103 of the network to the destination router 111 and server 112. Optical links 104 carry traffic between switches 103 using one or multiple wavelengths. Each OL carries one or more optical wavelengths, each wavelength, for example, having a capacity of several Mbps to several Gbps or more. In the current internet, the primary network level protocol is the Internet Protocol (IP), which is based on datagram and is inherently unreliable. The protocol on the top of (IP) is the Transmission Control Protocol (TCP) which is reliable and makes up for the unreliability of IP. In an OI, IP packets may be transported on Synchronous Optical Network (SONET), and/or on Asynchronous Transport Mode (ATM) which is the link and/or link and physical layer. These layers each occupy a portion of a particular wavelength in a Wave Division Multiplexer (WDM), or Dense WDM (DWDM). Providing IP in an OI may even be directly carried over separate wavelengths in a WDM optical network. In this manner the OI can share optical facilities with a WDM optical network.

A WDM cross-connect, included in the optical router 103, allows switching of input and output wavelength channels in the order of few milliseconds or less. Such switching times are considered very long for an individual cell and/or packet and, thus, it is unacceptable to switch individual packets/cells between input/output ports of a cross-connect. The internet traffic on the OI is expected to vary by session connection, by time of day, and over relatively longer periods of time than cross-connect switching times. Such variations represent the change in volume of traffic demanded by clients, and produced by servers and/or communications among distributed computer systems. For example, in a World Wide Web (WWW) session, if a user requests a video clip, the clip is fetched and transported from the WWW server to the client. This video clip can result in a large traffic burst in network traffic between the client (on one multiplexer) and the server (on another, or possibly the same multiplexer). On the same OL, several wavelengths can be used between the multiplexer 101 and the switch/router 103 and possibly among router 103 in the network during transport of the video burst in order to reduce network congestion and delay. Given the time scale for making cross-connection of optical wavelength channels, and the much longer session duration (seconds, minutes, hours and sometimes longer) between various clients and servers, we propose a method by which the number of channels between multiplexer and switch/router can be dynamically adjusted to accommodate the traffic variations. Because we switch wavelengths, our method is independent of the IP, TCP, and/or SONET/ATM protocols and from the transmission frame structure.

In the following paragraphs, first the general framework is stated and then illustrative cases of single and multiple optical links are considered.

General Framework

Figure 2:
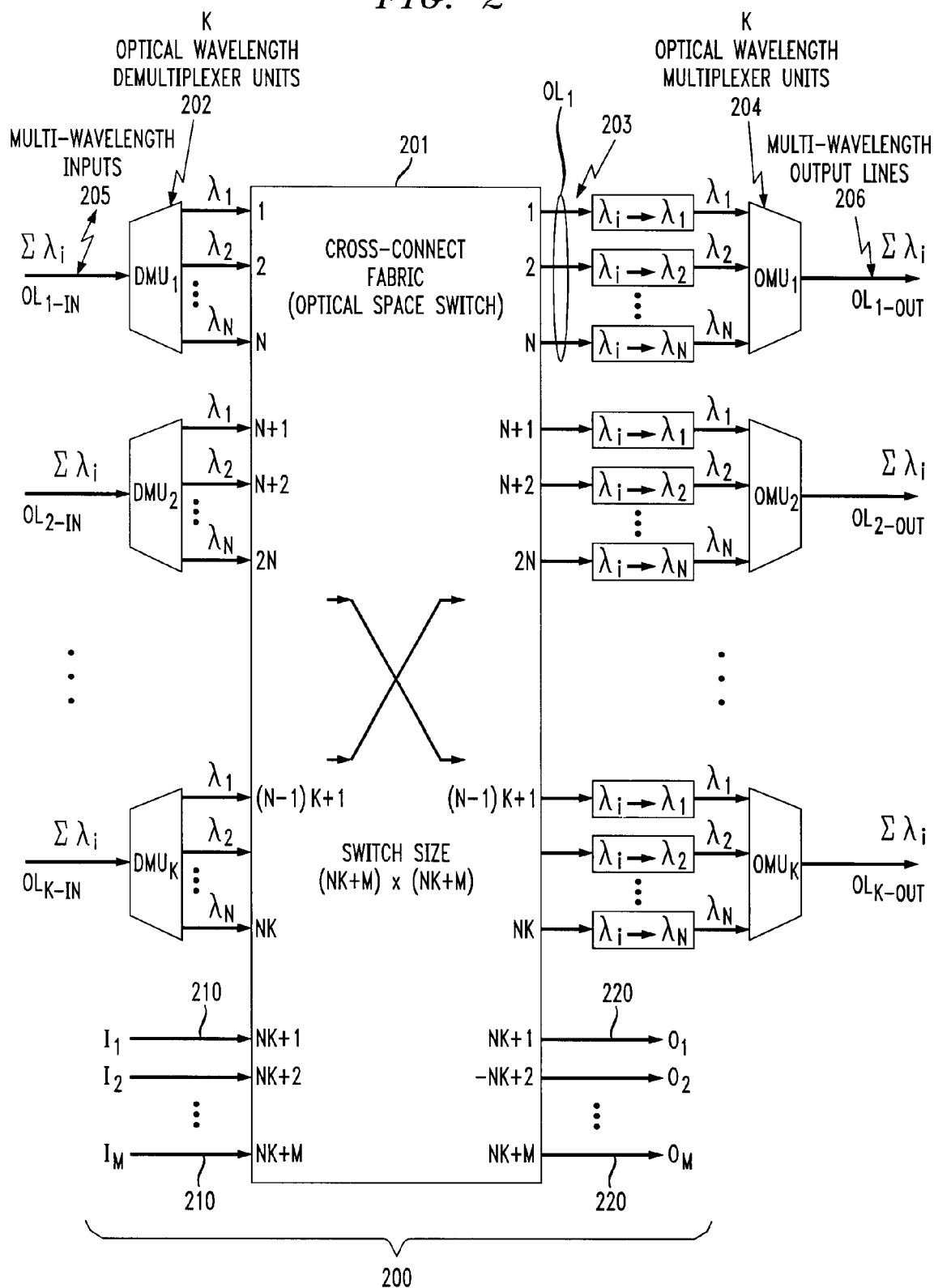
FIG. 2 shows an illustrative block diagram of a wavelength interchanging optical router.

With reference to FIG. 2, there is shown a generalized wavelength interchanging optical cross-connect system 200 (or router). This router 200 may be located at any of the locations 101, 103 and 111 of FIG. 1. The function of the router is to establish paths between inputs $OL_i$-IN, i=1, 2, . . . ,K (205) and outputs $OL_1$-OUT through $OL_K$-OUT(206) using optical cross-connect fabric 201. More particularly, the router of FIG. 2 consists of a cross-connect fabric (201) that includes an optical (NK+M) by (NK+M) space switch; a set of K optical wavelength demultiplexers, $DMU_1$ to $DMU_K$ (202) which demultiplex the incoming multi-wave input signal from $OL_i$-IN, i=1, 2, . . . ,K (205) into its components $\lambda_1, \lambda_2, \ldots \lambda_N$; a set of NK wavelength changers (203) which convert an input optical signal of any wavelength to an output signal of an assigned wavelength; and a set of K output optical multiplexer units $OMU_1$ through $OMU_K$ (204) which combine up to N incoming wavelengths $\lambda_1, \lambda_2, \ldots \lambda_N$ into a single multiwave optical link output, $OL_1$-OUT through $OL_K$-OUT(206). In addition, space switch 201 includes M single-wavelength input ports (210) and M single-wavelength output ports (220).

It should be pointed out that FIG. 2 shows the functionality of the optical cross-connect 200 and there are many ways to implement this functionality. For example, one may change the position of the wavelength interchangers 203 and the space switch 201; or may have wavelength changers 203 on both sides of the space switch; or may partition the switch 201 fabric to a plurality of smaller switch fabrics. These variations do not impact the concepts taught in this application.

In operation, the multi-wavelength signal on the K incoming optical links $OL_1$-IN through $OL_K$-IN (205) are demultiplexed 202 (passively, in this case) into its component wavelengths and are routed to a subset, NK of NK+M input ports of the space switch fabric 201. The switch fabric 201 is, functionally, a strictly non-blocking (NK+M)×(NK+M) optical space switch which can route (cross-connect) any of its (NK+M) inputs to any of its (NK+M) output ports.

In addition, the space switch 201 has M inputs 210 which accept single-channel (broad-band or single-wavelength) signals for routing. As will be explained later, the single channel signal may emanate from low-cost Network Interface Cards (NIC) at server locations (e.g., 102 of FIG. 1) or from any other non-compliant source.

The space switch 201 has M additional un-multiplexed output ports 220. The optical signals are routed to the corresponding network interface card broad-band receivers or to any other non-compliant signal sink (e.g., 102). The optical cross-connect 201, therefore, can combine any wavelength component from the K multiwavelength inputs as well as any of the M single-channel inputs ports 210 and route and combine them to either a WDM output ports 206 or to any of the single channel output ports 220.

An important point implied by FIG. 2 is that the functionality of the optical router 200 is independent of (transparent to) the bit rate, signal formal, protocol, or any other electrical characteristics of the data that are carried by the optical signals. Thus the internet protocol (IP), or any other protocol of any speed is accommodated by the system.

Figure 3:
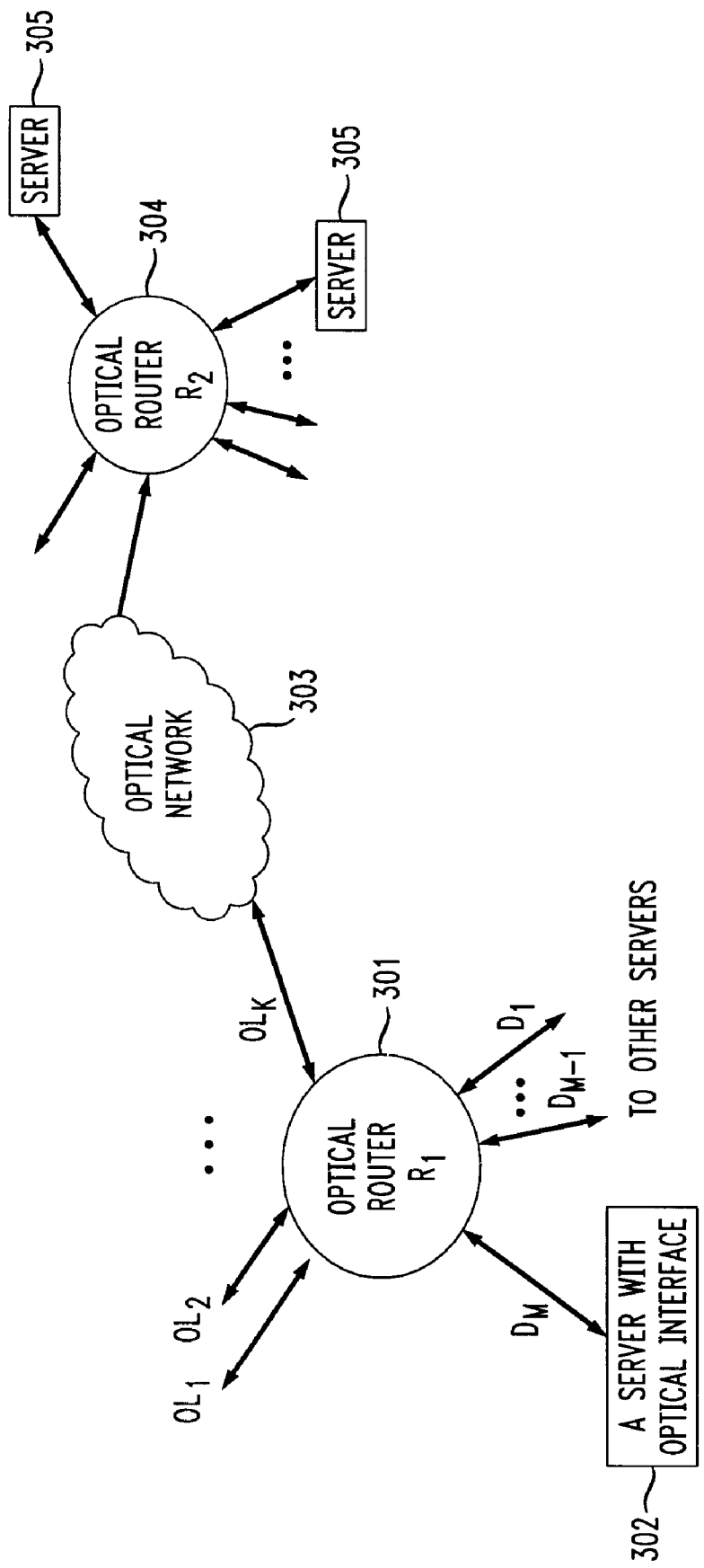
FIG. 3 shows a simplified diagram of the optical router of FIG. 2 and its connection to an optical network.

To simplify our discussions, we show the optical router of FIG. 2 using the simpler diagram shown in FIG. 3. FIG. 3 also shows the connection of the optical router 301 to a local server 302, to the optical network 303 and terminating router 304 and server 305.

As shown in FIG. 3, router 301 has K multiwave bi-directional links, $OL_1$–$OL_K$ the input direction including K multiwave inputs $OL_1$-IN through $OL_K$-IN of FIG. 2 and the output direction including K multiwave outputs $OL_1$-OUT through $OL_K$-OUT of FIG. 2. The router 301 also includes M bi-directional links $D_1$–$D_M$ which include the M single-wave inputs $I_1$ through $I_M$ and M single wave outputs $O_1$ through $O_M$ of FIG. 2. The multi wavelength input or output lines $OL_1$–$OL_K$ provide the two directions of traffic to other optical routers of optical network 303.

Note that K=2, the optical router of FIGS. 2 or 3 reduces to an add/drop multiplexer with wavelength changer which may be implemented by other means and technologies, such as by Fiber Bragg Gratings. Such an add/drop multiplexer may be implemented as described by C. R. Giles et al in the article "Low loss ADM for WDM Lightwave Networks" IOOC 1995, Paper THC2-1 and as described in the patent application by M. T. Fatehi et al entitled "Wavelength-Selective Optical Add/Drop system," Ser. No. 08/920,391, Filed on Aug. 29, 1997 and "Loss-Less Optical Cross-Connects," Ser. No. 08/777,391, filed on Dec. 31, 1996.

With continued reference to FIG. 3, in prior art systems, regardless of bit rate and format, traffic from a server 302 was modulated on a single-wavelength optical signal (such as giga-bit ethernet) by a low-cost network interface (NIC) and routed on a pair of fibers, e.g., $D_M$, forming a bi-directional link to the optical router 301. At router 301 the signal was re-modulated over a designated wavelength $\lambda_j$ and combined with the other traffic in router 301 and distributed over optical network 303 to the destination router 304 and server 305.

In accordance with the present invention, at each router, e.g., 301, the traffic demand from the local server 302 (i.e., a data source/sink) is observed and the required number of wavelengths are assigned by the router in accordance with a predefined allocation algorithm. With joint reference to FIGS. 3 and 4 we describe, in accordance with the present invention, an illustrative access control arrangement including a Time Division Multiplexer (TDM) 450 and Electrical/Optical (E/O) converter 460 (together also referred to as a dynamically assignable optical signal modulator 400) for use at a server (e.g., 302 of FIG. 3) or a router location of an optical network.

Figure 4:
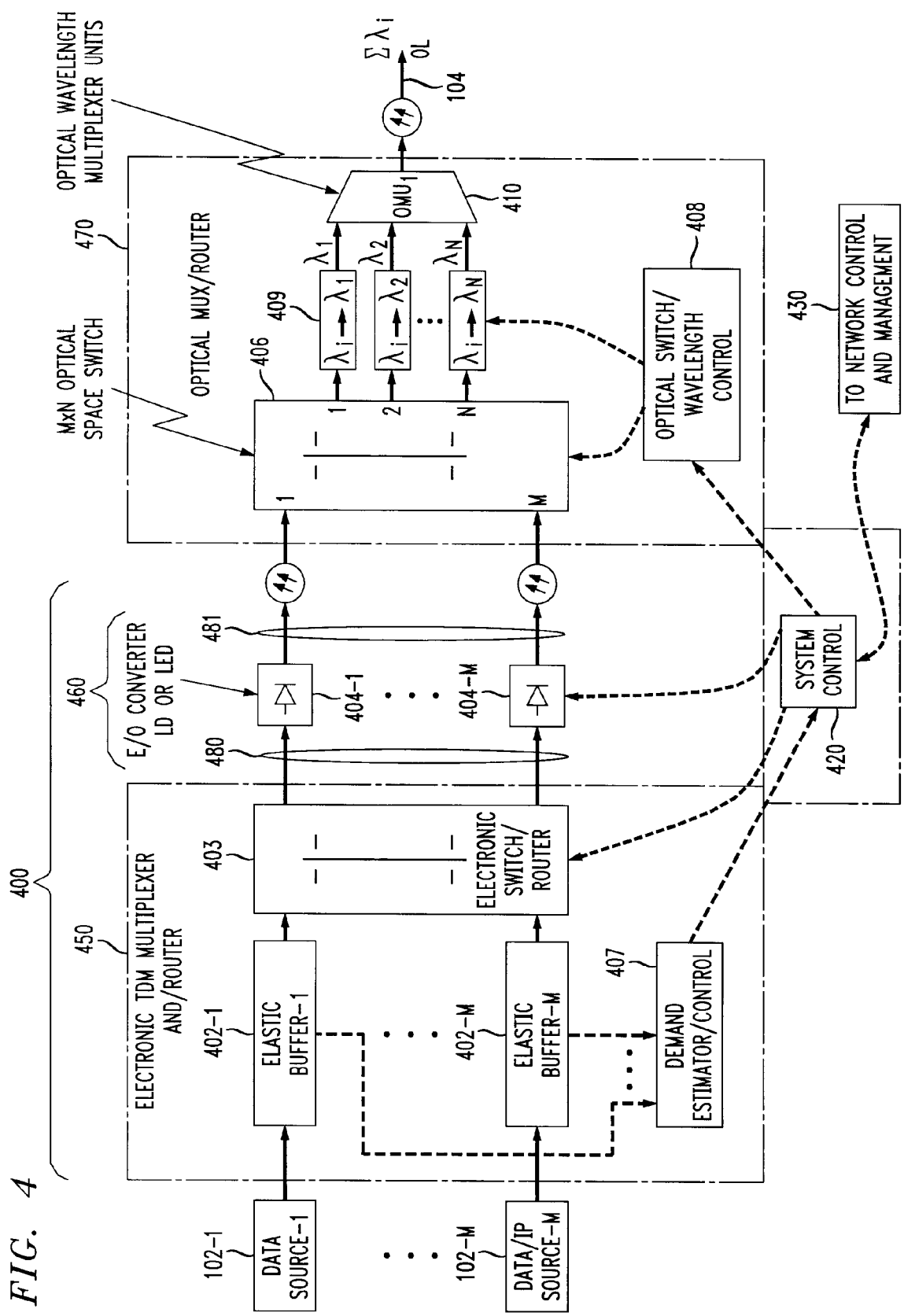
FIG. 4 shows, in accordance with the present invention, an illustrative access control arrangement including a dynamically assignable optical signal modulator apparatus for use at a server or router of an optical network.

Depending on the particular application, the TDM multiplexer 450 and E/O converter 460 can both be located at a router (e.g., 301 of FIG. 3) location or distributed between the router 301, data source/sink (e.g., server 302 of FIG. 3) or other intermediate location. When the TDM multiplexer 450 is located at the data source/sink location 302 an electrical facility 480 can be used to connect it to an E/O converters 460 located at an intermediate location (not shown) or at the router 301. When TDM multiplexer 450 and the E/O converter 460 are located at the data source/sink location 302, a low cost, short-distance optical facility 481 can be used to connect it to router 301. For the purposes of our discussions we assume that the TDM multiplexer 450 and E/O converter 460 are located at the router 301 location. As shown in FIG. 4, the data sources 102-1 through 102-M each output their data in electronic form to elastic buffers 402-1 through 402-M. Note that the data format of a source should be compatible with the destination (or data sink), that is they should communicate with each other using the same specification, e.g., gigabit Ethernet, etc, no other restriction is imposed by the optical network.

The electronic switch or multiplexer 403 combines the data from buffers 402 into a multiplexed signal. As will be discussed in later paragraphs, data from several of the data sources 102 can be combined together, using different time slots, to form a time division multiplexed (TDM) signal which is used as the modulating signal in the E/O converters. The output of the multiplexer 403 is modulated onto one or more optical signal using Electrical/Optical converters 404-1 through 404-M. The E/O converters 404 can be laser devices or Light Emitting Diodes (LEDs). Note that the number of E/O converters 404 can, more generally, be less than, equal to, or more than the number of data sources 302. The output from E/O converters 404 connect over optical facility 481 to the optical router 470 (e.g., 301 of FIG. 3). While, illustratively, router 470 is shown to include an M by N optical switch 406, N optical wavelength changers 409, and optical multiplexer 410 it should be understood the router 470 can, more generally, take the form of the router 470 shown in FIG. 2. If the router 470 was the FIG. 2 type router, it could also handle the WDM optical signals received/transmitted over a plurality of optical links $OL_1$–$OL_k$ all under control of system controller 420.

Returning to our illustrative router 470, the optical switch 406 connects any of the M inputs to any of the N outputs. The optical wavelength changers 409 convert the optical signals from optical switch 406 to different (e.g., standardized) wavelengths. The optical multiplexer 410 combine these wavelengths into a WDM optical signal for transmission over optical link 104.

In accordance with the present invention, a demand estimator controller 407 estimates the data rate or bandwidth required by each data source 102 and allocates one or more wavelengths to that data source 102. A wavelength controller 408 controls the assignment of wavelengths in router 470. A system controller 420 interacts with demand estimator controller 407, switch 403, E/O converters 460, and wavelength controller 408. System controller 420 communicates with a centralized network control and management system (NCM) 430, which coordinates the wavelength assignment, synchronization, and other control signaling at all of the routers of optical network of FIG. 3. Alternatively, the NCM 430 function can be distributed among the system controllers 420 at each of the routers. The communication facility between the various system controllers 420 and the NCM 430 can utilize a separate signaling facility or use part of one of the wavelength channels of an optical link.

As will be described in more detail in later paragraphs, at demand estimator controller 407 an algorithm determines from the occupancy level of a data source's buffer 402 how many wavelengths should be allocated to that data source. Other occupancy monitoring schemes such as bandwidth monitoring, etc. can also be used. Demand estimator controller 403 communicates with the system controller 420 which coordinates any wavelength assignment changes with the NCM 430. If the data bit (or packet) rate from data source is very low, demand estimator controller 407 may only assign one or more time slots of multiplexer 403 to that data source. The data from that data source would be combined with the data from other data sources and multiplexed together in multiplexer 403 and the multiplexed output used to drive one of the E/O converters. If the data bit (or packet) rate from data source is high enough, demand estimator controller 407 may assign more than one E/O converter 404 (i.e., use multiple optical carrier signals) to accommodate the data rate from that data source. The modulated multiple optical carrier signals from the E/O converters 404 would then be switched, in switch 406, to the wavelength converters 409 to select the proper wavelengths for output, via optical multiplexed 410, to OL 104. Note that, as the TDM capacity on each wavelength is filled, additional E/O converters 404 are turned on by system controller 420.

Again the system controller 420 determines the number and frequency of wavelengths to be utilized in coordination with the network control management 430.

It should be noted in FIG. 4 that it is possible to interchange the position of the electronic space switch 403 and the elastic buffers 402 (1 through M). Additionally, two sets of buffers can be used, one on either side of the electronic space switch 403, as is done in traditional electronic routers. Additionally, while separate buffers 402 are shown, it should be noted that a single shared buffer could be utilized instead.

Figure 5:
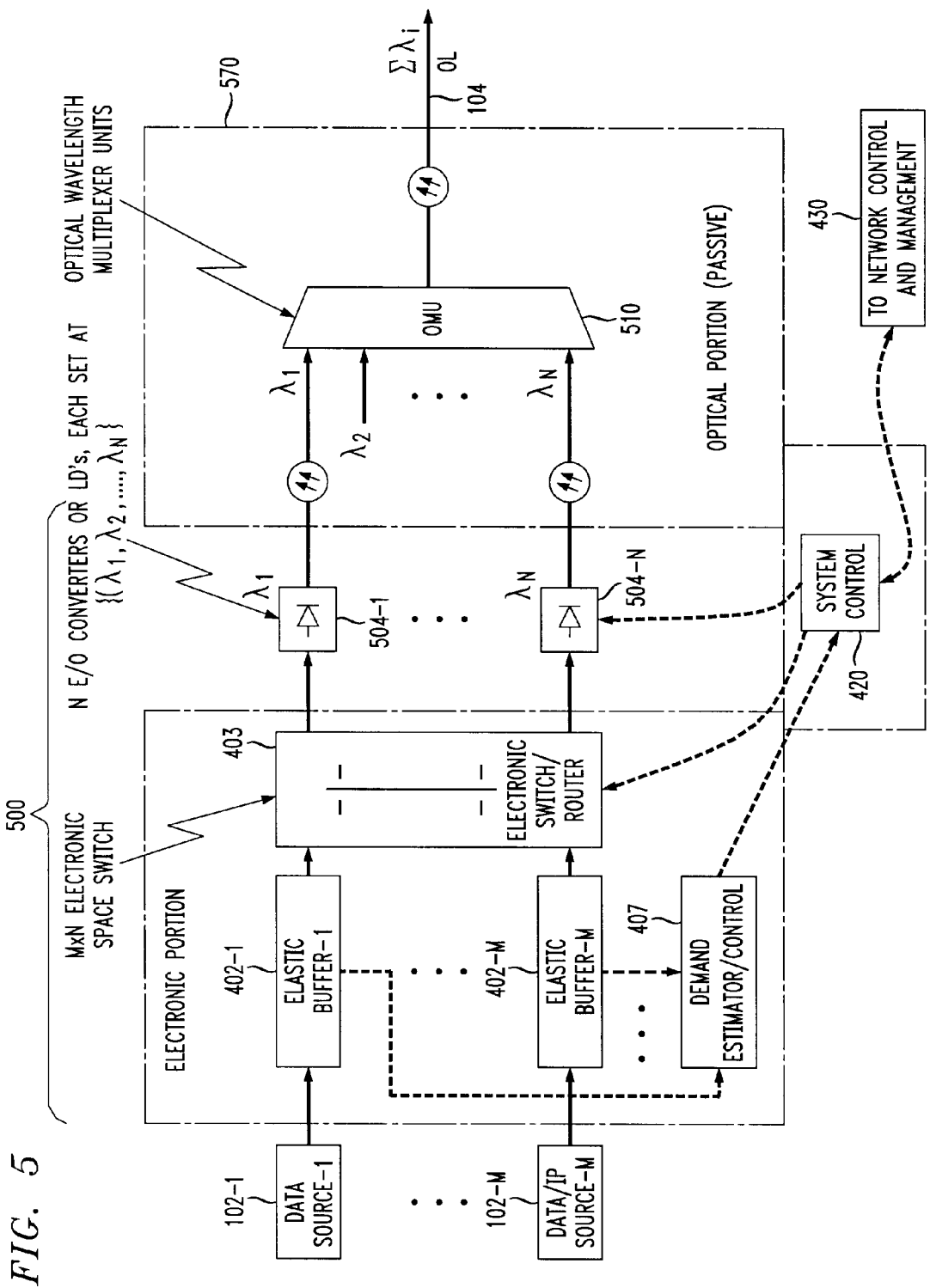
FIG. 5 shows an alternative design of a dynamically assignable optical signal modulator apparatus.

Shown in FIG. 5 is an alternate embodiment of an access control arrangement. In this arrangement, the data sources 102-1 through 102-M each output there data in electronic form to elastic buffers 402-1 through 402-M. The electronic switch or multiplexer 403 combines the data into a multiplexed signal. The output of the multiplexer 403 is used to modulate onto one or more optical signals by Electrical/Optical converters 504-1 through 504-N. In the arrangement, the E/O converters 504 are compliant lasers that can operate at a plurality of pre-set wavelengths ($\lambda_1$–$\lambda_N$) that can be selected under control of system controller 420. Again, note that the number of E/O converters 504 can, more generally, be less than, equal to, or more than the number of data sources 102. The output from E/O converters 504 connect to an optical router 570 (e.g., 301 of FIG. 3). Illustratively, the router 570 is shown to include only an optical multiplexer 510. Since the wavelength of E/O converter lasers 504 can be selected there is no need for the optical switch 406 and wavelength converters 409 used in FIG. 4. This functionality is combined with the electronic processor 500. The optical multiplexer 510 combines the wavelengths into a multi-wavelength optical signal for transmission over optical link 104. In the same manner as described in FIG. 4, a system controller 420 controls the demand estimator controller 407, switch 403, and E/O converters 504. As before, system controller 420 communicates with a centralized network control and management system 430, which coordinates the operations at all of the routers of optical network of FIG. 3.

Figure 6:
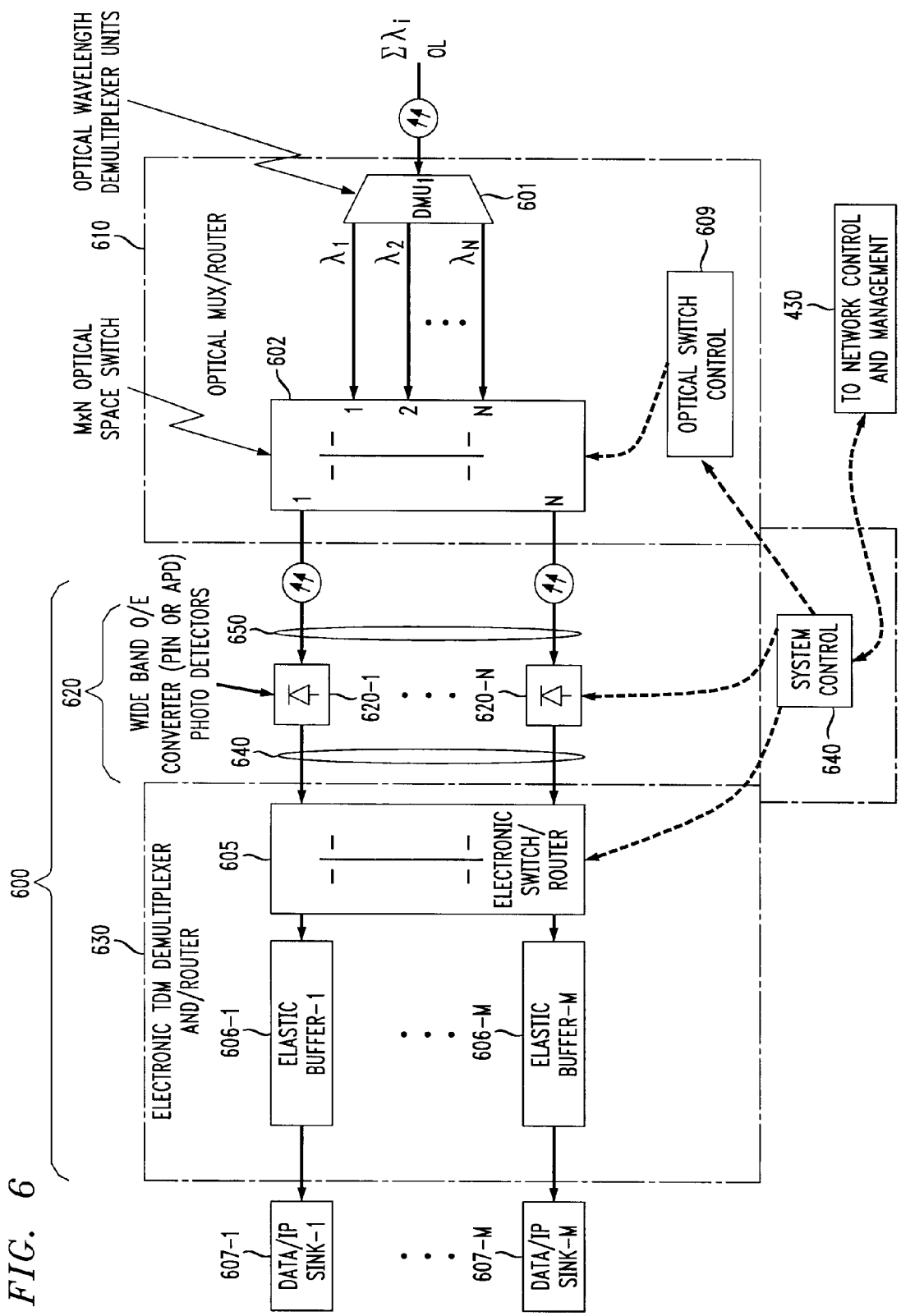
FIG. 6 shows, in accordance with the present invention, an illustrative signal distribution arrangement including a dynamically assignable optical signal demodulator apparatus for use at a server or router of an optical network.

Shown in FIG. 6, in accordance with the present invention, is an embodiment of an illustrative signal distribution (or demultiplexer) arrangement including our dynamically assignable optical signal demultiplexer apparatus. The signal demultiplexer arrangement could be located at a router location 304 or at one of the server (data sink) locations 302 shown in FIG. 3. For easy comparison with the access control arrangement of FIG. 4, the signal distributor arrangement of FIG. 6 has also been shown with the data flow from right to left.

FIG. 6 shows the optical demultiplexer or router 610 in addition to our dynamically assignable optical signal demodulator (which includes an Optical/Electrical (O/E) converter 620 and TDM demultiplexer 630). Depending on the particular network needs, the TDM demultiplexer 630 and O/E converter 620 can both be located at a destination router (e.g., 304 of FIG. 3) location or distributed between the router 304, server (e.g., 305 of FIG. 3) or other intermediate location. When the TDM demultiplexer 630 is located at the server 305 location an electrical facility 640 can be used to connect it to O/E converter 620 located at an intermediate location or at the router 304. When TDM demultiplexer 630 and the O/E converter 620 are located at the server 305 location, an optical facility 650 can be extended to connect it to router 610 (router 304). For the purposes of our discussions we assume that the TDM demultiplexer 630 and O/E converter 620 are located at the router 610 location (e.g., 305 of FIG. 3).

The WDM optical signal is received and demultiplexed at optical demultiplexer 601 and the individual wavelength signals are switched at optical switch 602. The individual wavelengths outputted from optical switch 602 are detected using the O/E wide band converters or photo detectors 620 (illustratively PIN diode or avalanche photodiode[APD] devices). The O/E converters 620 detects and demodulates the optical signals to produce electrical data signals which are routed or switched in electronic switch 605 to the appropriate buffers 606-1 through 606-M. Note, because several wavelengths may be associated with the data packet destined for a particular data sink, e.g., 607-1, electronic switch 605 may connect the outputs of several of the O/E converters 620 to one buffer 606-1. The data signals are then outputted from the buffers 606-1 through 606-M to the appropriate data sinks 607-1 through 607-M.

System controller 640 communicates with a centralized network control and management system 430, which coordinates the operations at all of the routers of optical network of FIG. 3. In this manner each data sink 607 receives only those data packets that are addressed to it from the transmitting data source.

With joint reference to FIGS. 4 and 6, it should be noted that the dynamically assignable optical signal modulator 400 of FIG. 4 could be combined with the dynamically assignable optical signal demodulator 600 of FIG. 6. In such an arrangement, the buffers (402 and 606), the electronic switches (403 and 605) and the optical space switches (406 and 602) can be packaged together. A common system controller could also be arranged to perform the functions of system controllers 420 and 640.

Figure 7:
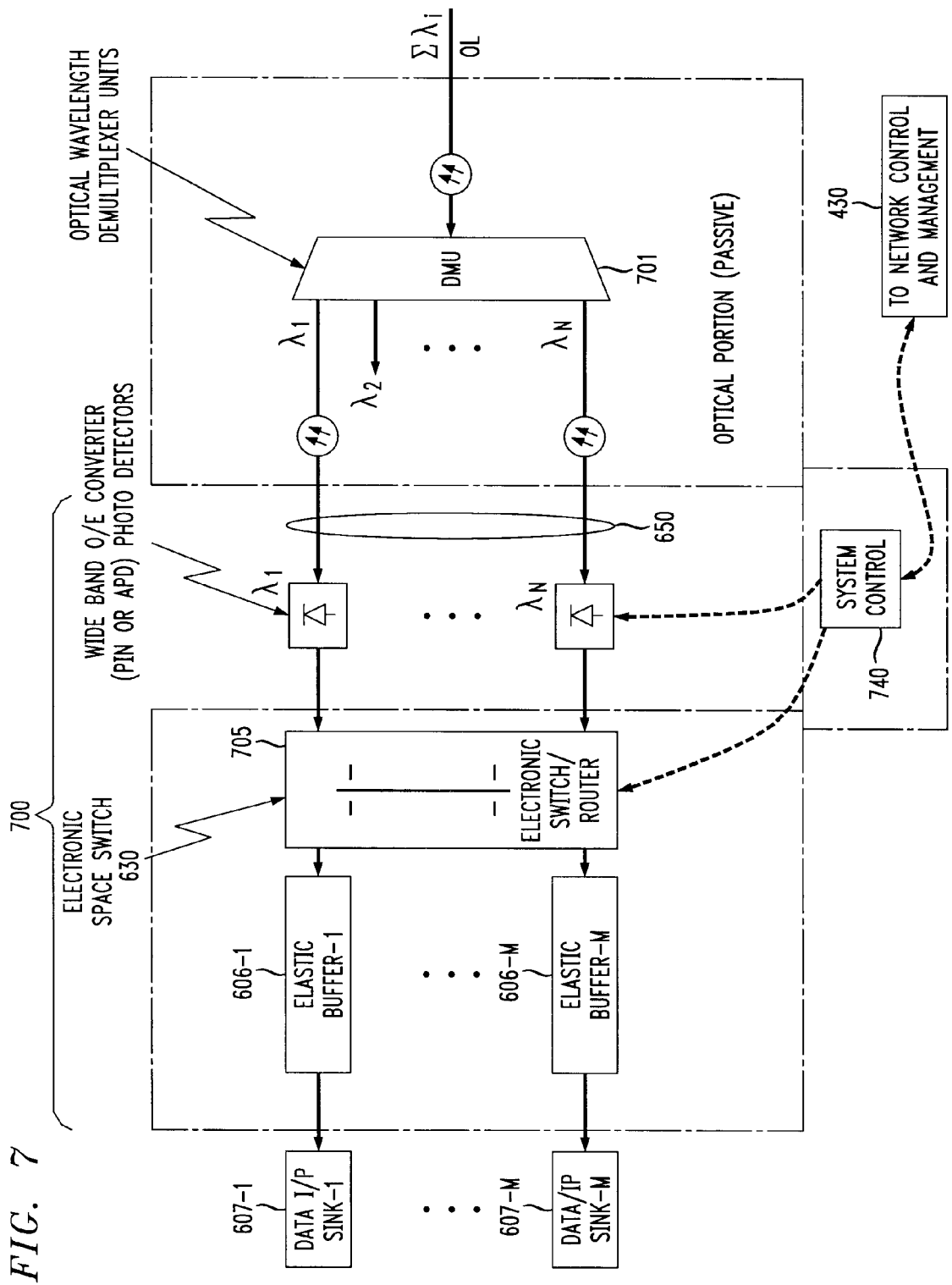
FIG. 7 shows an alternative design of a dynamically assignable optical signal demodulator apparatus.

Shown in FIG. 7 is a preferred embodiment of an optical demultiplexer signal distribution arrangement of FIG. 6 where the optical switch 610 and controller 609 has been eliminated. Thus, the electronic switch 705 is made to perform all of the necessary switching which was performed in FIG. 6 by electronic switch 605 and optical switch 602. The operation of FIG. 7, like that of FIG. 6, is controlled by system controller 740.

With joint reference to FIGS. 5 and 7, it should be noted that the dynamically assignable optical signal modulator 500 of FIG. 5 could be combined with the dynamically assignable optical signal demodulator 700 of FIG. 7. In such an arrangement, the buffers (402 and 606) and the electronic switches (403 and 705) can be packaged together. A common system controller could also be arranged to perform the functions of system controllers 420 and 740.

Figure 8:
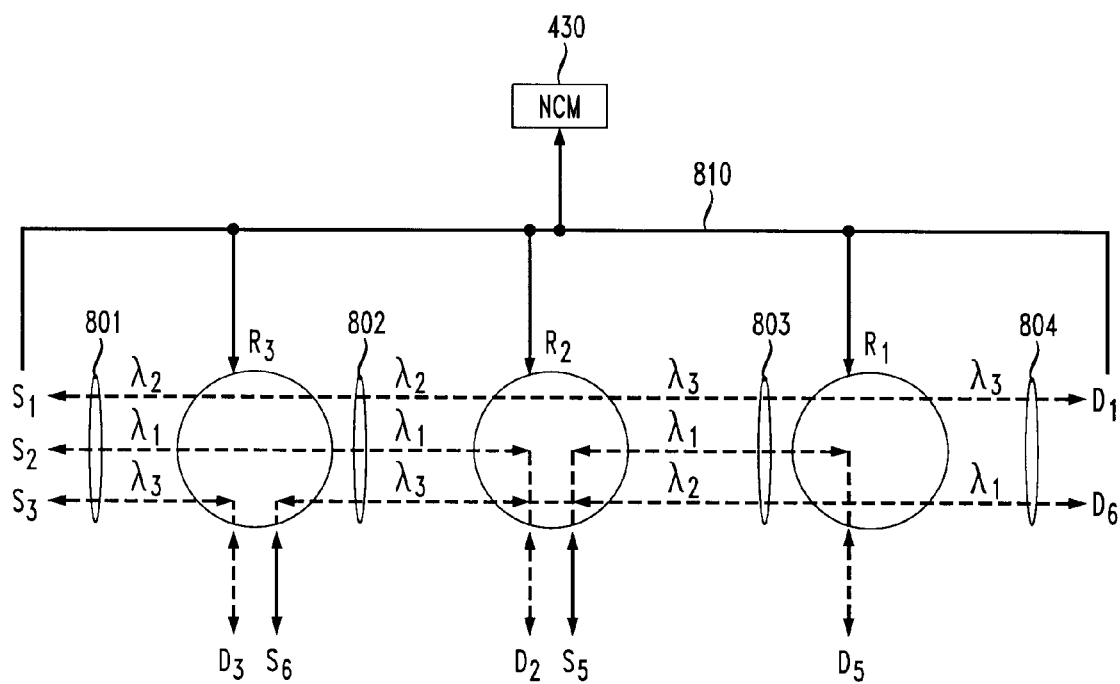
FIG. 8 shows illustrative communication paths between different sources and destinations over one or more routers of an optical network.

With reference to FIG. 8 there is shown illustrative interconnection paths between different sources S1–S6 and destinations (sinks) D1–D6 over one or more routers $R_1$–$R_3$. For example, in FIG. 8 source $S_1$ and destination $D_1$ require transport through routers/switches $R_1$, $R_2$ and $R_3$ while the source-destination pair $S_2$–$D_2$ require transport through routers $R_3$ and $R_2$ only. For the source-destination pair $S_3$–$D_3$, only router $R_3$ is involved. Each source-destination pair may use several wavelengths for transporting traffic through the different routers.

In FIG. 8, it is assumed that a multiwave ($\lambda_1$–$\lambda_3$) optical links 801–804, exist between all of the routers R1–R3. In this example, we assume there are only single-wavelength sources (servers) connected to each of the routers R1–R3 and only three wavelengths signals, $\lambda_1$–$\lambda_3$. In such an optical network, the functionality of the routers reduces to essentially that of an optical add/drop circuit with wavelength translation. This will allow wavelength translation of the local traffic onto any of the available wavelengths $\lambda_1$ through $\lambda_3$ which is then wavelength multiplexed with other traffic as shown in FIG. 8. Alternatively, at each router/switch (R) an arrangement similar to FIG. 2 may also be used where an optical cross-connect 201 and wavelength converters 203 are used for establishing a path between input and output ports.

It should be noted that traffic (at any bit rate) is carried over a wavelength which, indeed, may change several times in the network by other optical routers as it reaches its destination. Thus, illustratively, the traffic from source $S_1$ starts out at wavelength $\lambda_2$ and is maintained at that wavelength through router $R_3$ and is converted at router $R_2$ to $\lambda_3$ and is maintained at that wavelength through router $R_1$.

As noted, in FIG. 8 it is possible that individual wavelengths, e.g., $\lambda_2$, at some point in time may be arranged to carry traffic for $S_1$–$D_1$ path while at other times $\lambda_3$ may be used by other paths, e.g., for the $S_6$–$D_6$ path, and so on. All sources $S_j$, j=1, 2, 3 in this example may be on the same multiplexer and supported through the same optical cross-connect.

In accordance with the present invention, the number of wavelengths assigned to a multiplexer and to different paths is assumed to vary over time and is controlled by a system controller (e.g., 420) located at the multiplexer (or router). The system controllers at the source $S_1$, destination $D_1$, and at each of the routers R3–R1 along the path (e.g., $S_1$–$D_1$) all communicate, over facility 810, with network control management (NCM), e.g., 430. This communication can even be over a different facility, e.g., cellular link or satellite. The preferred method however would be to use a supervisory wavelength on the facility linking all the routers R3–R1. NCM 430 insures that the wavelength assignment along each link of the path is available for use is properly managed so that the source $S_1$ connects to the proper destination $D_1$. As previously discussed, this NCM function need not be centralized, e.g., at NCM 420, but instead could be distributed over all of the system controllers, e.g., 420, located at the routers $R_1$–$R_3$. At the source and destination locations, this wavelength management function includes monitoring and assigning wavelengths to the various user sources and destinations. At each router, wavelengths are allocated between the various sources/destinations requesting service and the various wavelengths being transmitted through that router. Thus, e.g., at router $R_3$, wavelength management insures that the wavelength capacity of optical links (OLs) 801 and 802 is not exceeded. Additionally, wavelength management insures that there is no duplication of wavelength frequencies on OL 801 and OL 802. Finally, at each router, since wavelength demand is dynamic, system controllers must periodically monitor wavelength demand and dynamically accommodate for these changes in demand. Thus, although the example of FIG. 8 shows that only one wavelength is assigned to each path, wavelength management may change the number of wavelengths utilized on each path in response to the variations of traffic over that path.

Figure 9:
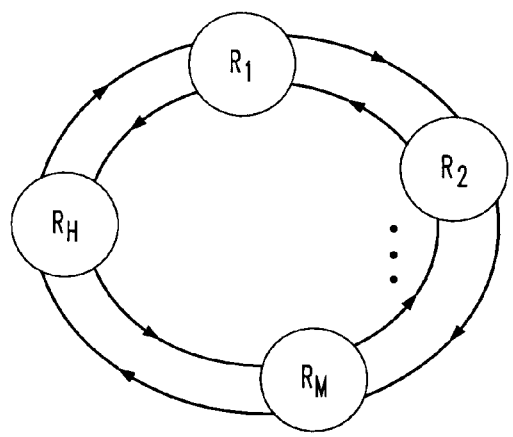
FIG. 9 shows an illustrative loop interconnection path between different routers of an optical network.

FIG. 8 shows a linear connection of optical routers $R_1$–$R_3$ allowing full connectivity, at various capacities among different nodes. In many practical applications, the network is protected against link failures by providing more than one physical path among end points. This may be achieved by changing the topology to a closed loop called "access loop" as shown in FIG. 9. This loop topology gives full connectivity much like a mesh topology among all nodes at varying capacities (number of wavelengths). It also has the advantage that if a link or a node fails, the connectivity is re-established via the alternate path in the loop.

Wavelength Access Control

The wavelength management function of adjusting the number of wavelengths on each path and/or on an optical link (OL) is as follows: Every $\tau$ units of time the number of connections, and/or number of packets at the buffers of multiplexer, e.g., 450, (or other parameters representing activity on the links) are observed by demand estimator control, e.g., 407. At the beginning of each control interval T, and based on the number of connections/packets at the multiplexer, the system controller, e.g., 420, determines the corresponding number of wavelengths required for each path. The number of assigned wavelengths remain active until the beginning of the next control interval T, at which time the process of determining the number of wavelengths repeats for the next time interval T.

We call $\tau$ the observation and T the control interval, where $\tau$ and T can be equal. (Note: T represents the interval of time at which the number of wavelengths is updated. However, we must have $T \geq \tau$. For improved performance, it is recommended that $\tau \ll T$.

In the following paragraphs, three cases are considered.
(A) Single Link Case:

For the purposes of our discussions, a single link case is where a router does not connect to more than one optical link (OL), e.g., 101 of FIG. 1. In this case, periodically the number of wavelengths on an OL between a multiplexer and switch, or between two switches which utilize optical cross-connect is determined. At the multiplexer (e.g. 450), or source switch, one or multiple queues (e.g., 402) contain cells/packets destined to the destination switch. The reason for adjusting the number of wavelengths on the OL, as discussed earlier is to adapt to the traffic volume between source/destination switches. An increase in the number of wavelengths assigned on a particular link reduces the available number of wavelengths from an optical cross-connect, which has a fixed number of total wavelengths that may be otherwise assigned to other links at the source switch. In this discussion, we ignore the impact of variations in the number of wavelengths at the cross-connect on the performance of other links, which may also use wavelengths from the source cross-connect (e.g., 201). The process of wavelength adjustment in the single link case is as follows: The number of cells/packets in the buffer for which the number of wavelengths should be decided is observed (by demand estimator controller 407) periodically every $\tau$ units of time. As discussed, suppose the number of entities in the queue or the number of connections on the link at the observation epoch n is $N_n$. At the beginning of each observation interval n, we determine the filtered value of $N_n$ denoted by $X^n$. Thus:

$$X^n = \alpha N_n + (1-\alpha)N_{n-1}, \text{ where } 0 < \alpha < 1$$

Suppose the observed value at the beginning of a particular control interval is Y. This corresponds to the last filtered $X^n$ determined at the beginning of $n^{th}$ observation interval. Depending on the total available number of wavelengths, we choose thresholds $Th_1$, $Th_2$, ..., $Th_k$, where $Th_0 < Th_1 < Th_2 ... < Th_k$. Based on the relative value of Y with respect to $Th_i$, i=0, 1, ..., k a number of wavelengths $L_i$, i=1, 2, ..., k is then assigned to the switch on that optical link. That is:

If $Th_{i-1} < Y < Th_i$, then choose $L_i$ wavelengths (i=1, 2, ..., k)

In particular, we can choose $L_i \geq 1$ so that at least one wavelength is assigned to a link during any control interval T. As the queue length or the number of connections on the link evolves, $N_n$ and subsequently Y is updated every $\tau$ units of time as well as at the beginning of every control interval; Y is used to determine the number of wavelengths over that control interval. Note that $L_k \geq L_{max}$ where $L_{max}$, an integer, is the largest number of wavelength that can be assigned at the multiplexer at any given control interval. Assignment of $L_i$ to $Th_i$ thresholds is such that the impact of using wavelengths on a given link also takes into account the performance of other links utilized from the source pool of wavelengths at the cross-connect. For example, suppose in a system T=1 sec, $\tau$=10 ms and $Th_0$=1, $Th_1$=10, $Th_2$=20 to represent thresholds. Also suppose $L_{max}$=16. A mapping of $L_i$ to $Th_i$ values may be as follows:

when $Y \leq Th_0$, choose $L_1$=1
when $Th_0 < Y \leq Th_1$, choose $L_2$=3
when $Th_1 < Y \leq Th_2$, choose $L_3$=5
when $Y > Th_2$, choose $L_4$=7

Other assignment algorithms are possible.

(B) Case Of Multiple Links in Parallel At The Same Switch:

The general case where an optical cross-connect switch, e.g., $R_3$ of FIG. 8, may be connected to multiple optical links (OLs) and a decision should be made as to how many wavelengths should be assigned to each link is more complicated than the single link case. For simplicity, we consider the case of 2 links at the same switch. The general case of more than 2 links at the same switch can easily be extended from this case. Extending the notations introduced in the single link case, now we denote $N_i^n$ as the number of entities observed at observation epoch n in queue i, or identically the number of connections through queue i. In the 2 link case considered here i=1, 2. Also let $\tilde{N}_i^n$ represent filtered value of $N_i^n$ for each queue. The thresholds chosen for the different links can be identical, or can be different. These thresholds depend on the queue size and how responsive to traffic fluctuations, the wavelength assignment should be. The closer these thresholds to each other, and/or the more thresholds, results in faster response to traffic variations. In the following, we assume both queues use the same thresholds. Case of different queue size thresholds can similarly be handled. Suppose the observed queue length at the beginning of a control interval is $Y^i$, i=1, 2. Suppose $L_{max}$, is the maximum number of wavelengths that can be assigned to both queues. The table shown in FIG. 10 illustrates the assignment rule.

With reference to the table of FIG. 10, the column 1001 represents the number of entities $Y^1$ in queue #1. The columns 1002 represent the varying number of entries $Y^2$ in queue #2. In the table all of the elements $A_i+B_j \leq L_{max}$ and $A_i$, and $B_j$, both integers, represent the number of wavelengths assigned to links associated with queue #1, and #2, respectively, at different threshold levels as shown in the table. As in the case of a single link, it is desirable to choose $A_0$ and $B_0 \geq 1$.

(C) Multiple Links in Tandem

In the case of tandem switches (e.g., $R_3$–$R_1$ of FIG. 8) these switches must coordinate with each other on the information that results in assigning wavelengths to different paths. A source/destination path may consist of single link (e.g., $S_5$–$D_5$ of FIG. 8), and/or of multiple links (e.g., $S_6$–$D_6$ of FIG. 8) that comprise a path between a given source switch and the rest of the network.

For example consider the case of FIG. 8. In this figure, the three paths $S_1$–$D_2$, $S_2$–$D_2$, $S_3$–$D_3$, at switch $R_3$ use the same cross-connect. At $R_3$, periodically a decision is made on the number of wavelengths to be assigned to each path from a total of maximum $L_{max}$ number of wavelengths. The queue lengths or the number of connections at the multiplexer associated with sources $S_1$, $S_2$ and $S_3$, are used to decide on the wavelengths' assignments.

Note that in this example, path $S_1$–$D_1$ is assumed to be dedicated to the traffic from $S_1$. In this case the wavelength assignment problem can be handled as in previous Case (B). In general however, the wavelengths assigned to this path (e.g., $\lambda_3$) may be used by the multiplexers at $R_2$ to share capacity for traffic to a destination on $R_1$. In this case, the decision on the number of wavelengths at $R_3$ and $R_2$ require exchange of queue length (filtered) information at the beginning of each control interval T.

What has been described is merely illustrative of the application of the principles of the present invention. Other arrangements can be implemented by those skilled in the art without departing from the spirit and scope of the present invention.

What is claimed is:

1. An optical signal access apparatus comprising
   a data buffer for storing received electrical data packets and for outputting electrical data packets the data using any of a variety of protocols;
   a plurality of optical signal modulators, each for modulating a different optical signal using the outputted data packets from the buffer;
   a switch, responsive to a control signal for switchably connecting the outputted data packets to one or more of the plurality optical signal modulators; and
   a controller for checking a data packet occupancy level of the buffer and, in response thereto, sending said control signal to the switch indicating a number of the plurality optical signal modulators to be assigned to receive the outputted data packets from the data buffer;
   the optical signal access apparatus being part of an optical router including
      an optical switch having a plurality of inputs for receiving modulated optical signals from the optical modulators and for switchable connecting than to a plurality of outputs;
      a plurality of wavelength interchangers connected to the outputs of the optical switch, each wavelength interchanger for changing a received optical signal to a selected one of a group of wavelengths in response to a control signal from the controller; and
      an optical multiplexer for multiplexing together the selected wavelengths outputted from the interchangers into a wavelength division multiplexed (WDM) optical signal.

2. The optical signal access apparatus of claim 1 wherein the controller checks the data packet occupancy level every $\tau$ seconds and sends control signals to the switch every T seconds, where T is $\geq \tau$.

3. The optical signal access apparatus of claim 1 being part of an optical network including
   a plurality of said routers and
   a centralized network control management apparatus for communicating signals for controlling the controllers of said routers.

4. The network of claim 1 wherein the router connects to at least one optical link for receiving and transmitting WDM optical signals thereover and wherein
   the controller also controls the assignment of wavelengths over the at least one optical link.

5. The optical signal access apparatus of claim 1 being part of an optical router and wherein
   the optical modulators are wavelength selectable lasers having wavelengths that are selected in response to a control signal from the controller and wherein the optical router includes
an optical multiplexer for multiplexing together the selected wavelengths outputted from the wavelength selectable lasers into a wavelength division multiplexed (WDM) optical signal.

6. The router of claim 5 being part of an optical network including
a plurality of said routers and
a centralized network control management apparatus for communicating signals for controlling the controllers of said routers.

7. The router of claim 5 wherein the router connects to at least one optical link for receiving and transmitting WDM optical signals thereover and wherein
the controller also controls the assignment of wavelengths over the at least one optical link.

8. The optical signal access apparatus of claim 1 wherein the optical modulators are light emitting diodes.

9. The optical signal access apparatus of claim 1 wherein the optical modulators are lasers.

10. The optical signal access apparatus of claim 1 wherein the controller is also responsive to a received network control management signal for generating the control signal.

11. An optical signal access apparatus comprising
an optical signal modulator apparatus including
a data buffer for storing received electrical data packets and for outputting electrical data packets, the data packets using any of a variety of protocols;
a plurality of optical signal modulators, each for modulating a different optical signal using the outputted data packets from the buffer,
a switch, responsive to a control signal, for switchably connecting the outputted data packets to one or more of the plurality optical signal modulators; and
a controller for checking a data pat occupancy level of the buffer and, in response thereto, sending said control signal to the switch indicating a number of the plurality optical signal modulators to be assigned to receive the outputted data packets from the data buffer; and
an optical signal demodulator apparatus including
a plurality of optical signal demodulators, each for demodulating a different received optical signal into electrical data packets;
a second switch, responsive to a second control signal, for switchably connecting electrical data packets outputted from one or more of the plurality of optical signal demodulators to a second data buffer;
the second data buffer used for storing received electrical data packets and for outputting electrical data packets; and
a second controller responsive to a received third control signal for sending said second control signal to the second switch indicating the number of optical signal demodulators to be connected to the second data buffer.

12. The optical signal access apparatus of claim 11 wherein the switch and the second switch are part of a combined switch, the buffer and the second buffer are part of a combined buffer, the controller and the second controller are part of a combined controller.

13. The optical signal access apparatus of claim 11 being part of an optical router including
an optical demultiplexer for demultiplexing a received wavelength division multiplexed (WDM) optical signal into said different received optical signals for said plurality of optical signal demodulators.

14. The optical signal access apparatus of claim 11 being part of an optical router including
an optical demultiplexer for demultiplexing a received wavelength division multiplexed (WDM) optical signal into a plurality of optical signals;
an optical switch for receiving said plurality of optical signals from the optical demultiplexer and for switchable connecting them to said plurality of optical signal demodulators.

15. A method of operating an optical router comprising the steps of
storing at a data buffer, received electrical data packets having any of a variety of protocols and outputting electrical data packets;
switchably connecting through an electrical switch, the outputted data packets to one or more of the plurality optical signal modulators;
modulating at the one or more of the plurality optical signal modulators, a number of different optical signals using selected ones of the outputted data packets;
checking at a controller, a data packet occupancy level of the buffer and, in response thereto, sending a control signal to the electrical switch indicating a number of the plurality of optical signal modulators to be assigned to receive the outputted data packets from the data buffer;
receiving at an optical switch, modulated optical signals from the optical modulators and switchably connecting them to a plurality of outputs;
at a plurality of wavelength interchangers connected to the outputs of the optical switch, changing an optical signal received from an output of the optical switch to a selected one of a group of wavelengths in response to a control signal from the controller; and
optically multiplexing together the selected wavelengths outputted from the interchangers into a wavelength division multiplexed (WDM) optical signal.

* * * * *